Feb. 27, 1968 G. T. KEAHL 3,370,503
RADIATION COMPARISON SYSTEM
Filed Dec. 9, 1963 2 Sheets-Sheet 1
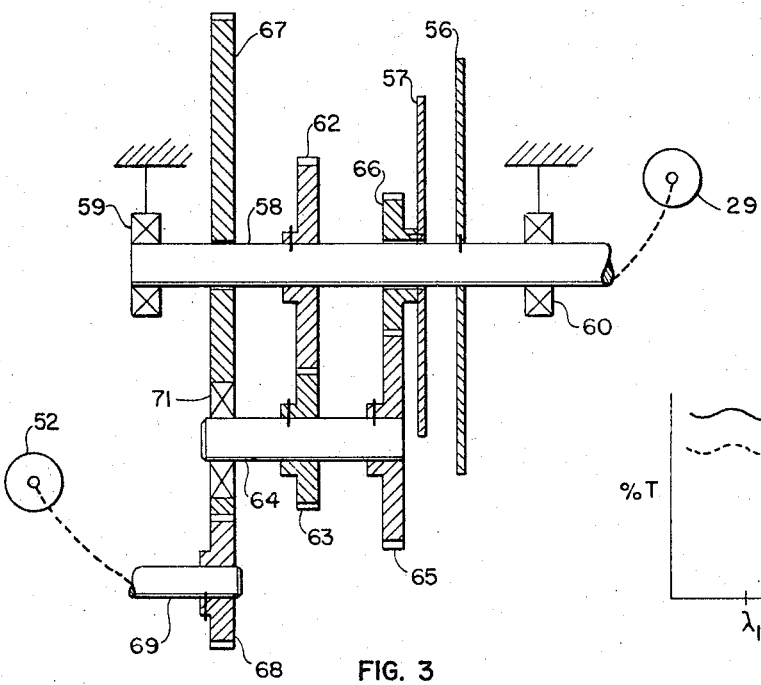
FIG. 3
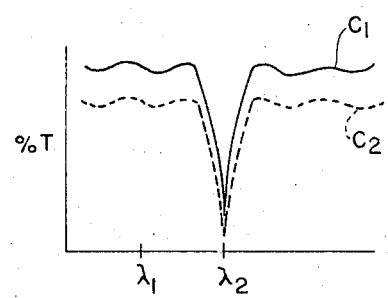
FIG. 1
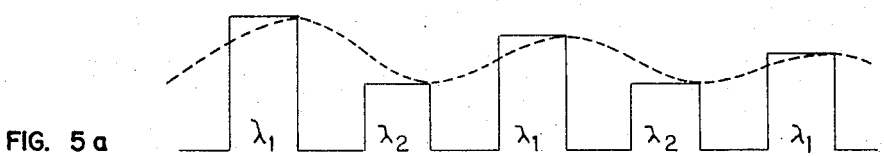
FIG. 5 a
FIG. 5 b
FIG. 5 c
FIG. 5 d
INVENTOR.
GERALD THOMAS KEAHL
BY Paul R. Harder
ATTORNEY Feb. 27, 1968 G. T. KEAHL 3,370,503
RADIATION COMPARISON SYSTEM
Filed Dec. 9, 1963 2 Sheets-Sheet 2

INVENTOR.
GERALD THOMAS KEAHL
BY
*Paul L. Harder*
ATTORNEY

United States Patent Office 3,370,503
Patented Feb. 27, 1968

3,370,503
RADIATION COMPARISON SYSTEM
Gerald Thomas Keahl, Fullerton, Calif., assignor to Beckman Instruments, Inc., a corporation of California
Filed Dec. 9, 1963, Ser. No. 328,907
6 Claims. (Cl. 88—14)

This invention relates generally to a radiation comparison system and more particularly to a single beam optical null spectrophotometer. The single beam optical null spectrophotometer constructed after the teachings of this invention further features a new and novel chopper-attenuator which may not only be advantageously utilized in the single beam system disclosed but in spectrophotometers of the double beam type.

Although double beam spectrophotometers provide, through the use of electronic ratio recording, automatic background variation compensation, such systems have not been widely used in the infrared region because of the inherent characteristics of the thermal type detectors. It has been the general practice in double beam recording spectrophotometers to utilize optical nulling principles in the infrared region.

Single beam spectrophotometers have found wide application in quantitative analysis not only because of simplicity and low cost but also because they may readily be used in infrared absorption spectroscopy. In operation of the single beam system it is the general practice to set the instrument at the wavelength of interest, block the optical beam and adjust the readout device to zero, unblock the optical beam and insert a sample cell containing only solvent and adjust the readout device for 100% reading. The cell is then filled with the solvent-sample mixture and the transmittance or absorbance measured on the appropriate scale. Following such a process the characteristics of the thermal type detectors do not adversely affect operation and the instrument may be readily utilized in the infrared region. However, due to the lapse of time between the initial set-up of the instrument and the measurement of the sample, absorption background energy variations adversely affect the final reading since the initial calibration of the readout device is no longer valid. By providing a single beam optical null system the stability of ratio recording or of optical null double beam systems may be approached while maintaining the simplicity of the single optical beam system.

It is, therefore, a principal object of this invention to provide an improved single beam optical null spectrophotometer.

Another object is to provide a single beam spectrophotometer having a high degree of stability in the presence of background energy variations.

A further object of the invention is the provision of a radiation comparison system which may be conveniently utilized in process instrument applications to continuously monitor or control a process which exhibits absorption bands affected by sample absorption to different degrees.

Still another object is to provide an improved single beam spectrophotometer wherein the sample to be analyzed is alternately subjected to different spectral regions whereby the principles of optical null can be utilized in a single beam spectrophotometer.

Yet another object of the present invention is the provision of a single beam radiation comparison system wherein the sample is alternately subjected to radiation of differing wavelengths which are affected by sample absorption to different degrees and wherein one of the wavelengths is automatically attenuated without change in the relative pulse width until an optical null with the radiation at the other wavelength is accomplished.

Another principal object of the invention is the provision of an improved optical chopper-attenuator which, although uniquely adaptable to the single beam optical null spectrophotometer of the present invention, has general application in radiation comparison systems.

Another object is to provide an optical chopper-attenuator which is capable of chopping an optical beam to provide a series of radiation pulses and attenuating alternate pulses without change in the relative pulse widths.

A further object is the provision of an optical chopper-attenuator which is capable of chopping an optical beam to provide at a detector a series of radiation pulses and linearly attenuating alternate pulses.

Still another object is to provide an optical beam chopper-attenuator capable of providing a series of radiation pulses and attenuating alternate pulses without producing any phase shift within the series of pulses.

To accomplish the foregoing objects a preferred embodiment of the invention contemplates the chopping of a radiation beam to provide a series of radiation pulses separated by a blanking period. The series of radiation pulses is passed through a sample and a wavelength selector system selects a first spectral region during alternate pulses and a second spectral region during intermediate pulses. The energy transmitted by the sample is converted to an electrical signal having an amplitude which is proportional to the absolute magnitude of the difference in the radiation passed in the two spectral regions and a polarity which is indicative of the sign of the difference. This electrical signal is utilized to control an optical attenuator to produce a null between the radiation in the two spectral regions.

Other novel details of construction and arrangement of parts and other objects and attendant advantages of the present invention will be more readily appreciated by those skilled in the art as the same becomes better understood by reference to the following detailed description when considered in connection with the accompanying drawings wherein:

FIG. 1 illustrates the spectrums of a sample for different concentrations;

FIG. 3 illustrates the details of the driving mechanism for a novel chopper attenuator constructed after the teachings of this invention;

FIGS. 5a–5d illustrate various optical and electrical signals at various points within the system of FIG. 2.

Figure 2:
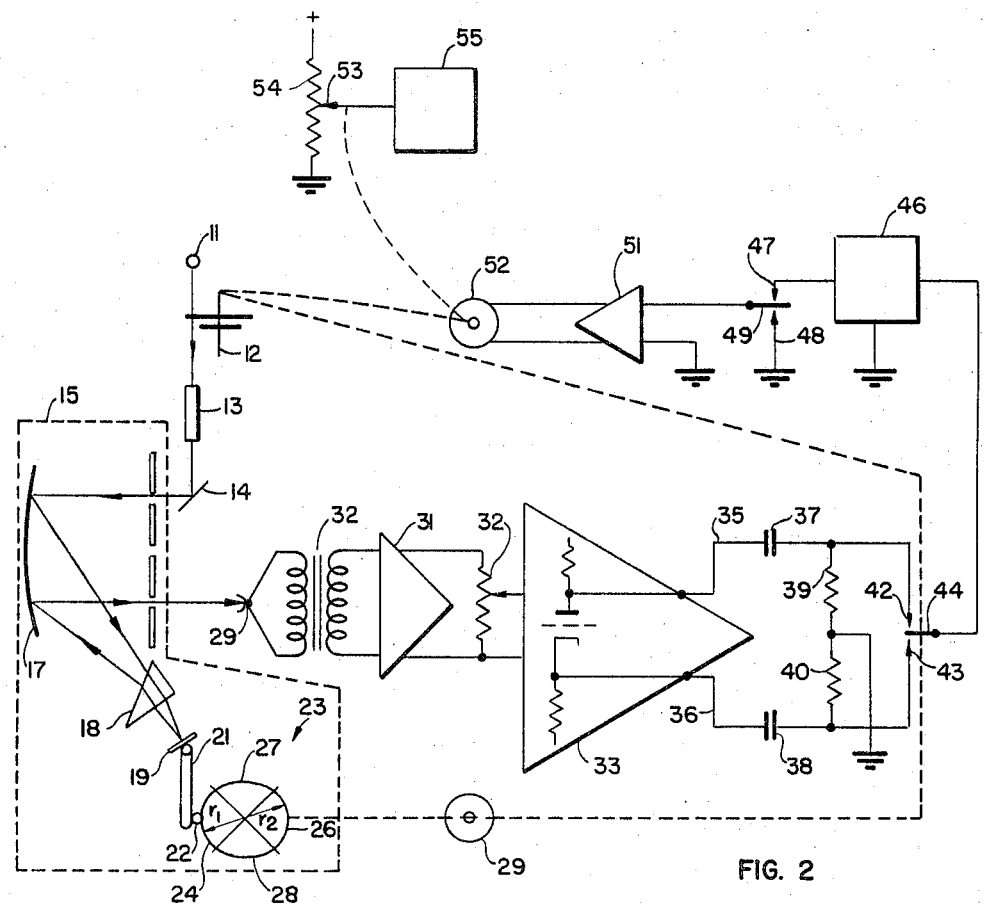
FIG. 2 is a schematic diagram of a radiation comparison system constructed after the teachings of this invention.

Referring now to FIG. 1 there is illustrated the spectrum of a sample where the percent transmittance, T, is plotted as a function of wavelength λ. The solid line indicates the spectrum for a concentration $c_1$ and the dotted line indicates the spectrum for a concentration $c_2$. From Beer's Law it is known that the concentration of a sample is equal to minus the log of the transmittance of the sample at a particular wavelength times a constant. Thus:

$$c = k_1(-\log T_1) = k_2(-\log T_2) \quad (1)$$

where $k_1$ and $k_2$ are constants, $T_1$ is the transmittance at a first wavelength $\lambda_1$ and $T_2$ is the transmittance at a second wavelength $\lambda_2$. Thus $$k_1 \log T_1 - k_2 \log T_2 = 0 \quad (2)$$

Let $$R = \frac{T_1}{T_2} \quad (3)$$

then $$\log T_1 - \log T_2 = \log R \quad (4)$$

Multiplying Equation 4 by $k_1$ and subtracting the resultant from Equation 2 gives:

$$(k_2-k_1) \log T_2 = -k_1 \log R \quad (5)$$

or $$\log T_2 = -\frac{k_1 \log R}{k_2-k_1} \quad (6)$$

Substituting Equation 6 in Equation 1 gives $$c = \frac{k_2 k_1}{k_2-k_1} \log R = \frac{k_2 k_1}{k_2-k_1} \log \frac{T_1}{T_2} \quad (7)$$

Since $k_1$ and $k_2$ are constants which may be determined for a particular sample at given wavelengths, Equation 7 shows that it is possible to determine the concentration of a sample by measuring the ratio of the transmittance of the sample at two wavelengths.

The single beam optical null spectrophotometer described in detail hereinafter has the capability of comparing the transmittance of a sample at different wavelengths and operates to produce an optical null through the use of a servo motor operating to control the phase relation of a pair of discs in the optical chopper-attenuator. The shaft movement of the servo motor from a reference position is a function of the ratio of the transmittance at the two wavelengths under consideration. By appropriate calibration and recordation of the shaft position the ratio of the transmittance at the two wavelengths may be determined. It is obvious that by appropriate calibration the apparatus may be utilized to record directly the concentration of a particular sample. By applying the apparatus to process instrument applications a continuous record of sample concentration may be obtained and by appropriate control systems the apparatus can be utilized to control the concentration of a particular component or components within the process.

Referring now to FIG. 2 there is illustrated one exemplary embodiment of the invention. Radiation from the source 11 is chopped by a chopper-attenuator 12 at any desired frequency, typically 11 c.p.s. The chopper radiation passes through a sample contained in sample cell 13 and is reflected by mirror 14 into the entrance slit of a two wavelength selector system, generally indicated as a prism monochomator 15. From the entrance slit the beam is reflected by a parabolic mirror 17 which serves to collimate the beams and direct them through a prism 18 which disperses it into a spectrum which is passed to the Littrow mirror 19. From the Littrow mirror the first beam is directed back through the prism for a second dispersion and then reflected from the parabolic mirror 17 through the exit slit of the monochromator. Although the system illustrated is generally known as a single pass monochromator in some instances it may be desirable to utilize a double pass monochromator to which the features of this invention are equally applicable.

As is well known the spectral region of radiation passing through the exit slit of the monochromator may be controlled by controlling the angle of Littrow mirror 19. Littrow mirror 19 is affixed to arm 21 having a cam follower 22 affixed to the opposite end thereof which engages a cam generally indicated by the reference numeral 23. Cam 23 has a first circumferential sector 24 having a constant radius $r_1$ corresponding to a first wavelength $\lambda_1$ and a second circumferential sector 26 having a constant radius $r_2$ corresponding to a second wavelength $\lambda_2$. Circumferential sectors 27 and 28 provide a smooth transition of the circumference of cam 23 from radius $r_1$ to radius $r_2$ and from radius $r_2$ to radius $r_1$. Cam 23 is driven by motor 29 in synchronism with the attenuator-chopper 12. By appropriate construction and synchronization of the chopper-attenuator 12 and cam 23 it is apparent that the output of the wavelength selector system 15 is a series of time spaced radiation pulses wherein a first wavelength $\lambda_1$ is passed during alternate pulses and a second wavelength $\lambda_2$ is passed during intermediate pulses. The wavelength selector system makes the transition from the first wavelength to the second and back during the blanking period between the radiation pulses.

The radiation output from the exit slit of the wavelength selector system is directed to a suitable radiation detector 29 which produces an electrical signal in accordance with the intensity of the impinging radiation. The output of detector 29 is coupled to the input of preamplifier 31 through transformer 32 which removes any DC component from the signal input to preamplifier 31. The output of preamplifier 31 is coupled through any suitable gain control device, such as potentiometer 32, to the input of power amplifier 33. The final stage of power amplifier 33 may conveniently comprise a single tube paraphase stage such that the instantaneous polarities of the signals appearing on lines 35 and 36 with respect to circuit ground are exactly opposite. Output lines 35 and 36 are connected through blocking capacitors 37 and 38 to opposite ends of a voltage divider comprising serially connected resistors 39 and 40 having their junction connected to circuit ground. Opposite ends of the voltage divider are respectively connected to fixed contacts 42 and 43 of a synchronous rectifier having an armature 44 driven by motor 29 in synchronism with chopper-attenuator 12 and wavelength selection cam 23.

The output of the synchronous rectifier is passed through filter 46 and applied to a comparator which compares the signal to a reference voltage. The comparator may conveniently take the form of a mechanical chopper as indicated in the illustrative embodiment having a fixed contact 47 connected to the output of filter 46 and a second fixed contact 48 connected to circuit ground. The armature 49 alternately engages contacts 47 and 48 at any desired frequency which conveniently may be 60 c.p.s. A difference signal is thus produced by the comparator and applied as the input to servo amplifier 51 having its output connected to servo motor 52. Servo motor 52 is mechanically linked to chopper-attenuator 12 and operates to attenuate radiation passed by the chopper-attenuator during alternate ones of the pulses until the radiation passed by the sample at both wavelengths is substantially equal.

The output of servo 52 may also be utilized to control the position of slide wire 53 along resistor 54 across which any suitable potential is applied. It is apparent that the voltage taken from the slide wire is proportional to the shaft position which is a function of the ratio of the transmittance of the sample at the two wavelengths. This signal may be applied to a recorder 55 for recording the signal at slide wire 53. It is apparent that the recorder through appropriate circuitry or calibration may be utilized to record either the ratio of the transmittance of the sample at the two wavelengths or as has been hereinbefore pointed out may be utilized to directly record the concentration of the sample. It is further obvious that the output of servo 52 may be utilized to control the amount of sample within a process stream to maintain the sample at a constant value. It is further obvious that by introducing a programmed input to fixed contact 48 of the comparator and utilizing the servo for controlling the amount of sample in a process that the amount of sample may be controlled in accordance with the impressed program.

Figure 4:
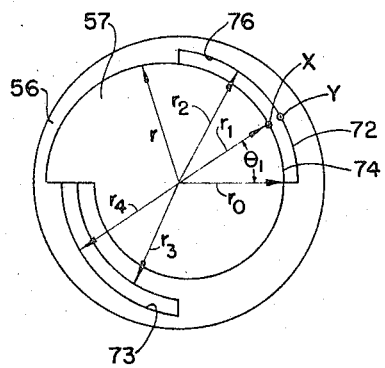
FIG. 4 illustrates a plan view of the chopper-attenuator.

Referring now to FIGS. 3 and 4 there is illustrated in greater detail an optical chopper-attenuator suitable for use in the single beam optical null spectrophotometer illustrated in FIG. 2. The optical chopper-attenuator has a pair of opaque discs 56 and 57 and are driven at the same basic speed by motor 29 but the phase of disc 57 with respect to disc 56 may be changed in accordance with the output of servo motor 52.

Shaft 58 is supported in bearings 59 and 60 rigidly secured to any suitable support. Shaft 58 is driven by synchronizing motor 29 and has affixed thereto disc 56 and gear 62. Gear 62 engages and drives gear 63 rigidly affixed to shaft 64. Shaft 64 drives gear 65 which is rigidly affixed thereto and which engages gear 66 mounted in such a manner as to freely rotate about shaft 58. Disc 57 is secured to gear 66 and also freely rotates about shaft 58. Gear 67 is mounted for free rotation about shaft 58 and is engaged by gear 68 rigidly secured to shaft 69 and driven by servo 52. Shaft 64 is mounted in bearing 71 secured within gear 67.

In operation it is apparent that as shaft 58 is driven by synchronizing motor 29 discs 56 and 57 rotate at the same basic speed, disc 56 being rigidly secured to the shaft and disc 57 being driven through the gear train comprising gears 62, 63, 65 and 66. Shaft 64 driven by gear 63 rotates within bearing 71 and shaft 58 rotates within gear 67. When shaft 69 is rotated by servo 52 gear 67 is rotated about shaft 58. Rotation of gear 67 carries with it shaft 64 thereby rotating gear 63 about the circumference of shaft 64. This circumferential rotation adds an additional component to the rotation of shaft 64 which is imparted to disc 57 through gears 65 and 66 but has no effect on the rotation of disc 56. Thus, while discs 56 and 57 are being rotated at the same basic speed by synchronizing motor 59 disc 57 may be rotated relative to disc 56 by servo motor 52.

Disc 56 has a pair of oppositely disposed apertures 72 and 73 formed therein. The inner edge 74 of aperture 72 is an arc defined by the function $$r_1 = r_0 + \frac{s}{\alpha}\theta \tag{8}$$

and the outer edge 76 is defined by the function $$r_2 = r_0 + \frac{s}{\alpha}\theta + s \tag{9}$$

where $s$ is the width of the aperture 72, $\alpha$ is the total angle over which the aperture extends, and $\theta$ is the angle of rotation in polar coordinates from the radius $r_0$ and is expressed in radians. It will be readily apparent from these equations that the edges of the aperture are defined by a pair of Archimedean spirals spaced apart by a distance $s$.

Disc 57 has an outer circumference also defined by the function $$r = r_0 + \frac{s}{\alpha}\theta \tag{10}$$

It is apparent that for a fixed angular relation between discs 56 and 57 that the outer circumference of disc 57 may be made congruent with the inner edge 74 of aperture 72.

Let $x$ be any point on the circumference of disc 57 congruent with the inner edge 74 of aperture 72 when discs 56 and 57 are in a zero phase relationship. Then the radius to point $x$ may be defined by an angle $\theta_1$ and $$r_x = r_0 + \frac{s}{\alpha}\theta_1 \tag{11}$$

The point $y$ lying on the outer edge of aperture 72 along the same radius as point $x$ is then defined as $$r_y = r_0 + \frac{s}{\alpha}\theta_1 + s \tag{12}$$

A point lying on the circumference of disc 57 $\alpha$ radians away from point $x$ is defined as $$r = r_0 + \frac{s}{\alpha}(\theta + \alpha) = r_0 + \frac{s}{\alpha}\theta_1 + s \tag{13}$$

From inspection of Equations 9 and 13 it is apparent that the radius $r$ and the radius $r_y$ are equal. Therefore, by rotating the disc 57 through an angle $\alpha$ with respect to disc 56 the circumference of disc 57 is now congruent with the outer edge 76 of aperture 72. Since $s$ and $\alpha$ are both constants it is also apparent that as disc 56 is rotated aperture 72 is linearly closed and that by controlling the angle of disc 57 with respect to disc 56 the aperture width may be controlled.

If the inner and outer edges of aperture 73 are defined by the functions $$r_3 = r_0 + \frac{s}{\alpha}(\theta + \pi) \tag{14}$$

and $$r_4 = r_0 + \frac{s}{\alpha}(\theta + \pi) + s \tag{15}$$

it is apparent that the outer circumference of disc 57 will always lie within the inner edge of aperture 73 so long as the angle of rotation of disc 57 with respect to disc 56 is less than $\pi$ radians.

In the preferred embodiment of the invention illustrated the angle $\alpha$ over which the apertures extend is approximately 90° and since the apertures are oppositely disposed the arrangement produces a chopper wherein the radiation beam is chopped twice each revolution and the blanking periods and the radiation pulse widths are substantially equal.

If discs 56 and 57 are rotated in a counterclockwise direction as viewed in FIG. 4 it is apparent that with respect to a fixed point the aperture moves in an inwardly direction. For this reason it is desirable that the width of apertures 72 and 73 be made equal to approximately one-half of the optical beam height at the point where the beam passes through the disc. Thus the aperture begins at one point on the beam and traverses it along its height. By making both apertures of the same general shape compensation is obtained for any non-linearity of the beam intensity as a function of its height. It is apparent that the only other requirement of the shape of aperture 73 is that it lie outside the area blocked by disc 57 as it rotates through an angle equal to $\alpha$ relative to disc 56.

It is apparent that if discs 56 and 57 are maintained in the angular relation illustrated in FIG. 4 and interposed in an optical beam as illustrated in FIG. 1 radiation passing sample 13 will be a series of time spaced radiation pulses having a frequency of twice the speed of rotation of the chopper-attenuator. By proper synchronization of wavelength selection cam 23 and discs 56 and 57 it is apparent that any desired spectral region can be selected during the period of time aperture 72 passes the source image and that a second spectral region can be selected during the period when aperture 73 passes the source image. During the blanking period between the apertures the transition from the first to the second spectral regions and back may be made.

Let it be assumed that a sample of concentration $c_i$ having a spectrum illustrated by the solid line of FIG. 1 is introduced into the sample cell 13. The intensity of the radiation at wavelength $\lambda_1$ will be greater than the intensity of the radiation at wavelength $\lambda_2$ and an optical signal similar to that illustrated in FIG. 5a will impinge upon detector 29. Let it be assumed that $\lambda_1$ and $\lambda_2$ lie in the infrared region and that detector 29 is of the thermal type such as a thermocouple. The output of thermocouple 29 will be an electrical signal which lags the radiation signal by approximately 90° and is indicated by the dotted line in FIG. 5a. Any DC component is removed by transformer 32 and the alternating signal is amplified by amplifier 33. The output of power amplifier 33 appearing on line 35 is indicated by the solid line in FIG. 5b and the output on line 36 is indicated by the dotted line. FIG. 5c illustrates the time sequence of the synchronous rectifier with respect to the output of amplifier 35, the solid portion of the line indicating that period of time when armature 44 contacts fixed contact 42 and the dotted portion indicating the period of time when armature 44 contacts fixed contact 43. The output of the synchronous rectifier is indicated in FIG. 5d. The signal output of the synchronous rectifier is filtered and appears at fixed contact 47 of the comparator which compares voltage with respect to voltage at fixed contact 48. When the intensity at the wavelength of $\lambda_1$ is larger than the intensity of wavelength $\lambda_2$, as indicated in FIG. 5, the output voltage applied at contact 47 is a positive voltage whose amplitude is indicative of the difference between the radiation intensities at the two wavelengths.

Let is now be presumed that the intensity at wavelength $\lambda_2$ is greater than the intensity at wavelength $\lambda_1$. It is apparent that the output of the thermocouple will be shifted in phase by approximately 180° as will the outputs appearing at lines 35 and 36 of power amplifier 33. Under these conditions the voltage appearing at armature 44 of the synchronous rectifier will be negative in polarity and will have an amplitude proportional to the difference between the intensities at the two wavelengths. The error signal produced a tthe comparator is applied through servo amplifier 51 to control servo motor 52 in such a manner as to rotate disc 57 to reduce the intensity of the radiation during the period that wavelength $\lambda_1$ is selected.

It is apparent to those skilled in the art that because of the optical null principles utilized herein that the single beam system disclosed has the same inherent stability of optical null double beam systems yet is considerably simpler than such systems. It is further obvious that the system may be utilized over the entire range of the spectrum inasmuch as the speed of response of the detector does not affect the operation of the system. In a system utilizing a prism monochromator of the type illustrated, it is obvious that the spectral region selected during the alternate pulses will be a narrow band of radiation having a band width in the order of 1 m$\mu$. It is also apparent that the band width of the wavelength selection system is dependent upon the particular wavelength selection system utilized and the invention is not intended to be limited to the specific embodiment of the wavelength selecting system illustrated. Where more narrow band widths are desirable double pass monochromators or prism grating monochromators may be utilized. Where the particular spectrum of the sample is substantially constant over a fairly wide radiation band a pair of radiation filters could be utilized rather than the monochromator illustrated with any suitable mechanism for introducing the filters in appropriate synchronism with the attenuator-chopper. Further, the apertures within disc 56 could carry the necessary filters. It should further be understood that the relative positions of the chopper-attenuator, the sample and the wavelength selection mechanism are not critical. For example, radiation from the source could be chopped and passed through the wavelength selection mechanism before passing to the sample or passed through the wavelength selection mechanism and then chopped before passing to the sample. It is further possible that the radiation could be chopped after passing through the sample however such an embodiment is not generally practical particularly in the infrared region since radiation emitted by the sample would be chopped and errors introduced thereby. The invention may also be embodied in an apparatus wherein no optical chopping takes place but wherein the selected wavelength is cyclically varied between two desired wavelengths and the output of the detector is chopped to obtain the desired electrical signal representing these two wavelengths.

Although the invention has been particularly described in connection with the exemplary embodiments thereof illustrated it should be understood that various changes, modifications and substitutions, other than those hereinbefore mentioned, may be made without departing from the spirit of the invention and the scope of the appended claims.

What is claimed is:

1. A radiation comparison system having an optical beam path for passing radiation from a source to a sample, the improvement comprising:

chopper attenuator means including a first rotatable means having at least two apertures therein for chopping said radiation to form discrete radiation pulses and a second rotatable means for rotation with said first rotatable means and including means for progressively blocking at least one of the apertures in said first rotatable means for attenuating alternate ones of said radiation pulses by changing the phase of said second rotatable means with respect to said first rotatable means;

wavelength dispersing means operated in synchronism with said first rotatable means and providing a first spectral region during alternate ones of said radiation pulses and a second spectral region during intermediate ones of said radiation pulses;

means comparing the energy in said first and second spectral regions, said means being connected to said chopper attenuator means for controlling the phase of said second rotatable means with respect to said first rotatable means for equalizing the energy in said first and second spectral regions.

2. In a radiation comparison system having an optical beam path for passing radiation from a source through a sample, the improvement comprising:

chopper attenuator means for chopping said radiation to form discrete radiation pulses and for attenuating alternate ones of said radiation pulses, said chopper attenuator means including first and second rotatable means, one of said rotatable means chopping said radiation to form said discrete radiation pulses and the other of said rotatable means attenuating radiation during alternate ones of said radiation pulses by changing the angle of said other rotatable means with respect to said first rotatable means;

a monochromator including dispersing means operated in synchronism with said first rotatable means and providing a first narrow spectral region during alternate ones of said radiation pulses and a second narrow spectral region during intermediate ones of said radiation pulses;

detector means receiving said radiation pulses and producing an electrical signal in accordance with the radiation in said first and second narrow spectral regions;

means connected to said detector means and said chopper attenuator means for controlling the phase of said second rotatable means with respect to said first rotatable means to equalize the energy in said first and second narrow spectral regions.

3. In a radiation comparison system having an optical beam path for passing radiation from a source through a sample, the improvement comprising:

chopper attenuator means for chopping said radiation beams to form discrete radiation pulses and for attenuating alternate ones of said radiation pulses, said chopper attenuator means including a first rotatable means having apertures therein for chopping said radiation beam and a second rotatable means progressively blocking at least one of said apertures when the phase of rotation of said second rotatable means is changed with respect to said first rotatable means;

wavelength selection means operated in synchronism with said first rotatable means and providing a first spectral region output during alternate ones of said radiation pulses and a second spectral region output during intermediate ones of said radiation pulses;

detector means positioned to receive the radiation from said wavelength selection means and producing an electrical signal in accordance with the radiation received;

means connected to said detector means for producing an alternating signal having an amplitude proportional to the difference in energy between said first and second spectral regions and a phase indicative of the sign of the amplitude;

means for providing a direct current signal having an amplitude that varies in accordance with the amplitude of said alternating signal and a polarity which varies in accordance with the phase of said alternating signal;

means comparing said direct current signal with a reference to produce an error signal having an amplitude which varies in accordance with the said direct current signal and said reference signal and a sign which varies in accordance with the sign of that difference;

means responsive to said error signal and controlling the phase of said second rotatable means with respect to said first rotatable means to equalize the energy in said first and second spectral regions.

4. In a radiation comparison system having an optical beam path for passing radaition from a source through a sample, the improvement comprising:

a first rotatable means having a plurality of apertures therein for chopping said radiation to form discrete radiation pulses of given time duration;

second rotatable means progressively blocking alternate ones of said apertures for providing attenuated alternate radiation pulses of the same time duration;

a wavelength selection means;

means driving said wavelength selection means, said first and second rotatable means in synchronism, said wavelength selection means providing a first spectral region during alternate ones of said radiation pulses and a second spectral region during intermediate ones of said radiation pulses;

means comparing the energy in said first and second spectral regions and controlling the phase relation of said second rotatable means with respect to said first rotatable means for attenuating the radiation in one of said narrow wavelength bands.

5. In a radiation comparison system having an optical beam path for passing radiation from a source through a sample, the improvement comprising:

a first rotatable means for chopping said radiation to provide a series of discrete radiation pulses;

said first rotatable means having at least one aperture defined by spaced inner and outer Archimedean spirals;

a second rotatable means for attenuating alternate ones of said discrete radiation pulses, said second rotatable means having an outer limit in the form of an Archimedean spiral such that the outer limit of said second rotatable means progressively and linearly closes said one aperture as the phase of rotation of said second rotatable means with respect to said first rotatable means is changed;

wavelength selection means;

means driving said first and second rotatable means and said wavelength selection means in synchronism, said wavelength selection means providing a first spectral region during alternate ones of said radiation pulses and a second spectral region during intermediate ones of said radition pulses;

means comparing the energy at said first and second spectral regions; and means responsive to said means for comparing for changing the phase relation of said second rotatable means with said first rotatable means for equalizing the radiation in said first and second spectral regions.

6. In a radiation comparison system having an optical beam path for passing radiation from a source through a sample, the improvement comprising:

chopper attenuator means including a first rotatable means having apertures therein for chopping said radiation to form discrete radiation pulses of given time duration and a second rotatable means for progressively blocking alternate ones of said apertures as the phase of said second rotatable means is shifted with respect to said first rotatable means for providing alternate attenuated radiation pulses of the same time duration;

drive means for rotating said first and second rotatable means in synchronism and for selectively shifting the phase of said second rotatable means with respect to said first rotatable means;

control means connected to said drive means and responsive to the energy in said discrete radiation pulses and controlling the phase relationship of said second rotatable means with respect to said first rotatable means for equalizing the energy in said pulses.

References Cited
UNITED STATES PATENTS 2,439,373   4/1948   Sterns _____ 88—14

JEWELL H. PEDERSEN, *Primary Examiner.*

BERNARD J. LACOMIS, *Assistant Examiner.*